Pardee & Judson,
Jointing Staves.
Nº 5713. Patented Aug. 15, 1848.
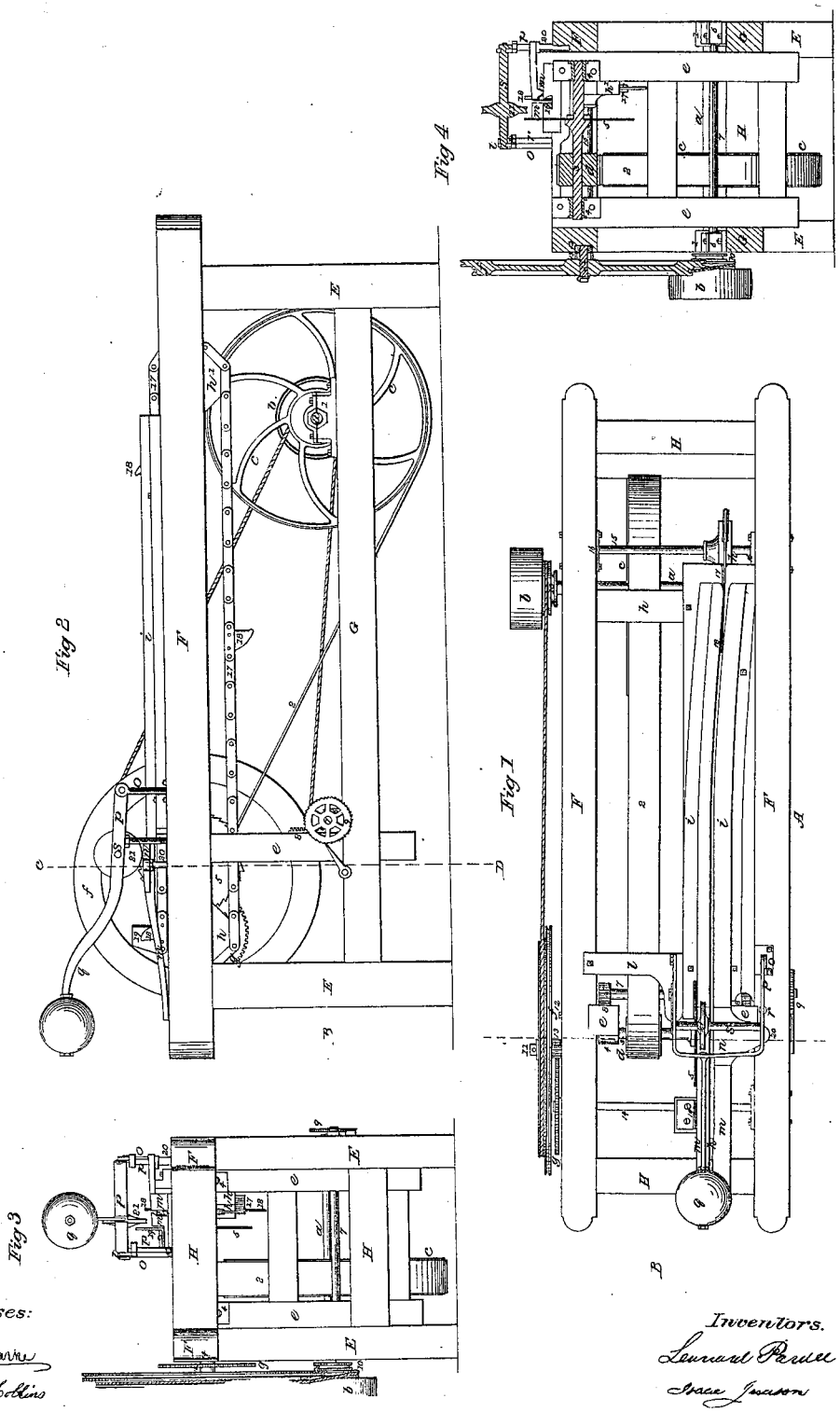
Witnesses:
Samuel J. Clarke
Francis S. Collins
Inventors.
Leonard Pardee
Isaac Judson

UNITED STATES PATENT OFFICE.

L. PARDEE AND I. JUDSON, OF NEW HAVEN, CONNECTICUT.

MACHINERY FOR JOINTING STAVES.

Specification of Letters Patent No. 5,713, dated August 15, 1848.

*To all whom it may concern:*

Be it known that we, LEONARD PARDEE and ISAAC JUDSON, of the city of New Haven and State of Connecticut, machinist, have invented and made and applied to use certain new and useful improvements in the application, arrangement, and combination of mechanical means for jointing or beveling the edges of staves for casks, which cut the bevel or radial angles on the edges of each stave to correspond with the natural crook or wind of the stave itself, so that when set up in the truss-hoops each stave takes its proper position, with a fair outside to the cask, and we produce these effects by presenting each edge of each stave in succession in a curvilinear direction, over an adjustable beveled bed, to the operation of an edging-saw while held down by a roller and lever, for which improvements we seek Letters Patent of the United States, and that the said improvements are constructively, operatively, and substantially set forth in the following description and shown in the drawing annexed to and making part of this our specification of the said improvements, wherein—

Figure 1, is a plan; Fig. 2, an elevation, on the side A, of the plan; Fig. 3, an end elevation, at the end B, of Figs. 1 and 2, and Fig. 4, is a vertical cross section of the parts, through the line C, D, of Figs. 1 and 2, as if seen from the end B. These figures represent a machine, with the parts as constructively and collectively applied by us, to these purposes, and the same letters and numbers, as marks of reference, apply alike to the same parts, in each of the several figures.

E, are the posts; F, the upper, and G, the lower longitudinal ties, and H, the cross ties, collectively forming the frame, on which the working parts are mounted.

$a$, is the principal driving shaft, mounted on journal boxes 1, and fitted with a driving drum $b$, to connect the machine with any competent motive power, in any usual manner. Within the machine, the shaft $a$, carries the principal internal drum $c$, with a belt 2, to the drum $d$, on the saw shaft 3, which is mounted in journals 4, and carries the circular saw 5, on the vertical saw gate $e$. This is set to slide in the frames F, and G, and is governed by a shaft 7, with pinions, set in journal boxes 6, on the lower frame piece G, the pinions on the shaft 7, gearing into vertical racks 8, on the saw gate. These will raise and lower the gate, and saw, when needful, and securely hold them at any given height, by a ratchet wheel and pawl 9, on one end of the shaft 7. Between the driving drum $b$, and the frame, a pulley 10, takes a band, that connects it to the principal pulley $f$, mounted on a stump shaft 11, projecting from a slotted bracket frame, only shown endwise, in the Fig. 4, but which is housed, or countersunk, into that side of the frame piece F, and regulated by a screw bolt 12, to admit the placing a larger or smaller pinion 13 on, and to travel with, the large pulley $f$. This pinion 13, gears into a spur-wheel $g$, set on the outer end of a cross shaft 14, to carry the feeder chain wheel $h$, at this end of the machine. At the other end, a shaft 15, is set in journal boxes 16, 16, adjustably secured by screws, going through slots, into the inner sides of the top frame pieces F, and carries the second feeder chain wheel $h^1$. The two wheels $h$, and $h^1$, carry the endless feeder chain 17, which is fitted with feeder dogs 18, 18, 18. On each side of the chain 17, is a lower portion, and above these, an upper two part portion, of the curved and beveled bed $i$, $i$. The dogs 18, pass in the curved line, formed by these portions, to carry the staves forward. The lower bed pieces $i$, $i$, are supported, at one end, by a cross bearer $k$, and at the other end by a metal cross bearer $l$, and at the end next the saw, the curved bed pieces $i$, $i$, receive the ends of two metal beveled bearing beds $m$, $m$, one of which has a guide piece 19, serving the purpose of a guide to the edge of the stave, and of entering into the saw kerf, to pass the sliver away. A recess, in the other piece $m$, takes one end of a T formed changeable cant piece $n$, the cross of which has two short pins, entering holes in the piece $m$. The tail part of the cant piece $n$, is adjustable by a screw 20, entering that part of the frame piece F, on that side, and underlying the tail of the cant piece $n$, so that by turning the screw out the tail of the cant piece is raised, and the edge of the stave, presented to the saw, is cut with an increased bevel, or radial angle, but the contrary effect takes place, when the screw 20, is turned inward. The metal beds $m$, $m$, near the saw, are higher than the beds $i$, $i$, and beyond the saw, slope downward and outward, toward that end of the machine.

The cross piece $l$, has two standards $o$, $o$, the tops of which are jointed to two parts of a holding down frame $p$, having a weighted lever $q$. Between the sides of the frame $p$, a cross shaft $s$, carries a metal roller disk 21, with a grooved edge, and one end of the shaft $s$, goes through a slot, in that side of the frame $p$, into a bearing $t$, outside the frame, which bearing has a slot, to pass a screw into the frame. By this means, the shaft $s$, can be secured, at such an angle, as will make the grooved disk 21, travel fair with the curve of the staves passing beneath it. A pair of small standards $r$, $r$, are placed under the two sides of the frame $p$. By screwing these more, or less, into the parts beneath they will keep the grooved edge of the disk 21, from contact with the metal cant piece below. When the machine is thus fitted, and adjusted for use, and set in motion, the staves to be jointed are to be placed singly, and successively, with the face that is to be on the outside of the cask downward, on the bed piece $i$, $i$. A dog 18, coming up, behind the stave, forces it toward the saw 5, in a line similar to that, in which the dog itself travels, between the pieces $i$, $i$, and the grooved roller disk 21, forces the stave down, on the highest part of the metal cant bearers $m$, $m$, so that however crooked, or winding, the stave may be, either wholly, or in part, the distorted portion is presented to the saw, in such a position that the radial angle, or bevel of that part of the joint will be the same, to that part of the outer face of the stave, as the angle of any other and straighter portion of the stave, so that when set up, and forced together, in the truss hoops, each stave will take its proper place, with fair joints to the staves on each side of it.

We have described and shown a circular saw, as employed to cut the edges of the staves, but we intend to employ either that, or a cutter wheel, as the substance, or quality, of the staves, or the convenience of working, may require.

The saw, or cutter wheel, with its appurtenances, and the endless chain and dogs, are not new, and are therefore not claimed by us, as any part of our invention, but we believe ourselves to be the original, and first inventors, of means for compelling the dogs to travel in a curved line, and present staves to the action of a saw, or cutter wheel, by a corresponding curvilinear progress, on a cant piece, and beneath a roller disk, that forces the distorted parts of the staves into proper positions for cutting the edges, so as to form joints with a correct radial angle, or bevel, when set up; and We therefore claim as new, and of our own invention, and desire to secure by Letters Patent of the United States—

The application of the two part beveled bed $i$, $i$, with a curvilinear slot, forcing the dogs 18, to travel in the line between them, and present the edges of staves to the action of the saw, in a similar line, and the arrangement of the two part cant bed $m$, $m$, fitted with the adjustable cant piece $n$, in combination with the roller disk 21 to hold the stave so, that distorted parts are cut with the same bevel to themselves, that is given to the other parts of the staves; the whole constructively, operatively, and substantially as herein described and shown.

In witness whereof, we have hereunto affixed our signatures this eleventh day of January, one thousand eight hundred and forty eight.

LEONARD PARDEE.
    ISAAC JUDSON.

Witnesses:
 CHAS. S. INGERSOLL,
 FRANCIS S. COLLINS.